United States Patent [19]
Kato et al.

[11] Patent Number: 5,719,479
[45] Date of Patent: Feb. 17, 1998

[54] COLLISION DETECTING METHOD

[75] Inventors: Tetsuaki Kato, Hadano; Soichi Arita; Ichiro Kanno, both of Oshino-mura, all of Japan

[73] Assignee: Fanuc Ltd., Yamanashi, Japan

[21] Appl. No.: 518,689

[22] Filed: Aug. 24, 1995

[30] Foreign Application Priority Data

Aug. 24, 1994 [JP] Japan .................. 6-220878

[51] Int. Cl.$^6$ .............. F15B 9/00; G05B 5/00
[52] U.S. Cl. .............. 318/563; 318/566; 364/150; 364/184; 364/474.19
[58] Field of Search .............. 318/560, 561, 318/563, 566, 568.11, 568.2, 568.21, 568.22, 606–610, 432–434; 364/148–152, 157, 159–166, 184, 185, 474.16, 474.19; 395/91; 73/862.192, 862.193

[56] References Cited

U.S. PATENT DOCUMENTS

| | | | |
|---|---|---|---|
| 5,204,602 | 4/1993 | Iwashita | 318/561 X |
| 5,274,314 | 12/1993 | Maqueira | 318/632 |
| 5,304,906 | 4/1994 | Arita et al. | 318/568 |
| 5,418,440 | 5/1995 | Sakaguchi et al. | 318/560 |
| 5,435,729 | 7/1995 | Hildreth et al. | 364/165 X |
| 5,440,213 | 8/1995 | Arita et al. | 318/568.11 |
| 5,489,829 | 2/1996 | Umida | 318/561 |
| 5,493,192 | 2/1996 | Nihei et al. | 318/568.2 |
| 5,525,877 | 6/1996 | Umida | 318/432 |
| 5,533,166 | 7/1996 | Yoshida et al. | 318/609 X |
| 5,545,957 | 8/1996 | Kubo et al. | 318/432 |
| 5,568,028 | 10/1996 | Uchiyama et al. | 318/566 |
| 5,581,521 | 12/1996 | Nomura et al. | 369/32 |
| 5,587,636 | 12/1996 | Bar-Kana et al. | 318/561 |
| 5,598,077 | 1/1997 | Matsubara et al. | 318/568.22 |
| 5,602,347 | 2/1997 | Matsubara et al. | 73/862.193 |

*Primary Examiner*—Brian Sircus
*Attorney, Agent, or Firm*—Staas & Halsey

[57] ABSTRACT

A collision detecting method, in which a collision of a driven body driven by a servomotor is detected by a disturbance estimating observer. The method obtains a disturbance component which can be known in advance, subtracts the disturbance component from an input torque to generate a modified torque, and inputs the modified torque to a distrubance estimating observer.

6 Claims, 4 Drawing Sheets

COLLISION DETECTING METHOD

BACKGROUND OF THE INVENTION

1. Field of the Invention

The present invention relates to a collision detecting method, and more particularly, to a method for detecting collisions by means of software in an industrial robot.

2. Description of the Related Art

If a moving part (e.g., cutter, table, etc.) of a machine tool or an arm of a robot runs against an obstacle, a servomotor for driving the moving part or arm is urged to move in response to a movement command and produce a large torque. In some cases, therefore, the mechanism of the moving part of arm may be damaged. According to a known method of detecting this collision, the position deviation of a servo system is detected, and the collision is detected as an abnormal load when the position deviation exceeds a preset value. In another known method, the driving current of the servomotor is detected, and the collision is detected when the driving current exceeds a preset value.

According to these methods in which the collision or the like is detected by noticing the increase of the position deviation or driving current, however, a great torque has already been delivered to the servomotor by the time the collision is detected. Thus, this great force may possibly damage the mechanical part.

Accordingly, the inventors of this application have proposed a method in which a disturbance torque is estimated by means of a disturbance estimating observer, and a collision is detected as an abnormal load when the estimated disturbance torque exceeds a preset value (see Japanese Patent Application Laid-Open, KOKAI No. 3-196313).

According to the conventional collision detecting method which uses a disturbance estimating observer, however, the sensitivity of collision detection is lowered due to disturbance estimation which involves nonlinear disturbance elements.

Disturbance torques to be estimated by means of the conventional disturbance estimating observer include disturbance components attributable to gravity, coupling torque component attributable to interaction between arms, dynamic friction torque components produced by dynamic friction, torque components for activating arm ends, etc., as well as true indefinite disturbances such as collisions as objects of detection.

Some other torque components than the true indefinite disturbances, like the gravity disturbance components and coupling torque components, have nonlinear properties. In general, a disturbance estimating observer cannot satisfactorily follow nonlinear disturbances, such as gravity torque, interference torque, etc. Even in case true indefinite disturbances for the detection of collisions make no changes, estimated disturbance torques may possibly be changed by the nonlinear torque components, so that the sensitivity of collision detection may be lowered.

A robot arm, as a model of a control object for the construction of the disturbance estimating observer, is supposed to be a rigid body. Actually, however, the robot arm may be regarded as a vibration system, not rigid, and torques produced by the vibration system appear in the estimated disturbances, so that the accuracy of collision detection is lowered.

OBJECT AND SUMMARY OF THE INVENTION

The object of the present invention is to provide a method of collision detection by means of a disturbance estimating observer, whereby the aforementioned problems of the conventional methods can be solved, and only true indefinite disturbances can be estimated to ensure high-accuracy, high-sensitivity collision detection.

According to the present invention, a disturbance estimating observer is constructed for a control object, input components to and output components from the control object are applied to the disturbance estimating observer. When disturbances applied to the control object are estimated and outputted, disturbance components which can be known in advance are obtained out of disturbances produced in the control object, and the resulting components obtained by removing the above disturbance components from the input components to the control object are used as an input to the disturbance estimating observer.

FIG. 1 is a diagram for illustrating a method of collision detection by means of a disturbance estimating observer according to the present invention. Referring to FIG. 1, a control object 1 comprises a motor 5 and a moving part (e.g., robot arm) 6 which are connected through a vibration system. The moving part 6 is driven with an input torque τ which is applied to the motor 5. Disturbance torques are produced in the control object 1. The disturbance torques include true indefinite disturbances which are produced by collisions or the like and known disturbance components whose causes are known and whose sizes can be recognized in advance.

According to the disturbance estimating observer of the present invention, the known disturbance components are obtained in advance, and disturbance estimation is effected with the known disturbance components removed from the inputs to the observer. Thus, the disturbance components which can be known in advance, out of the disturbances produced in the control object, are removed from the disturbances to be estimated by the disturbance estimating observer. That is, the disturbance estimating observer estimates only the true indefinite disturbances and output them.

The disturbance components which can be known in advance, out of the disturbances produced in the control object, may be nonlinear disturbances, such as gravity torque, interference torque, dynamic friction torque, etc., and torque vibration system disturbances for activating arm ends. Since these disturbance components are excluded from the subject of disturbance observation, the disturbances delivered from the disturbance estimating observer will include only the indefinite disturbances to be produced by collisions or the like, so that the accuracy and sensitivity of collision detection can be improved.

BRIEF DESCRIPTION OF THE DRAWINGS

The foregoing and other objects and feature of the invention will become apparent from the following description of preferred embodiments of the invention with respect to the accompanying drawings, in which.

DETAILED DESCRIPTION OF THE PREFERRED EMBODIMENT

A preferred embodiment of the present invention will now be described in detail with reference to the accompanying drawings.

Figure 3:
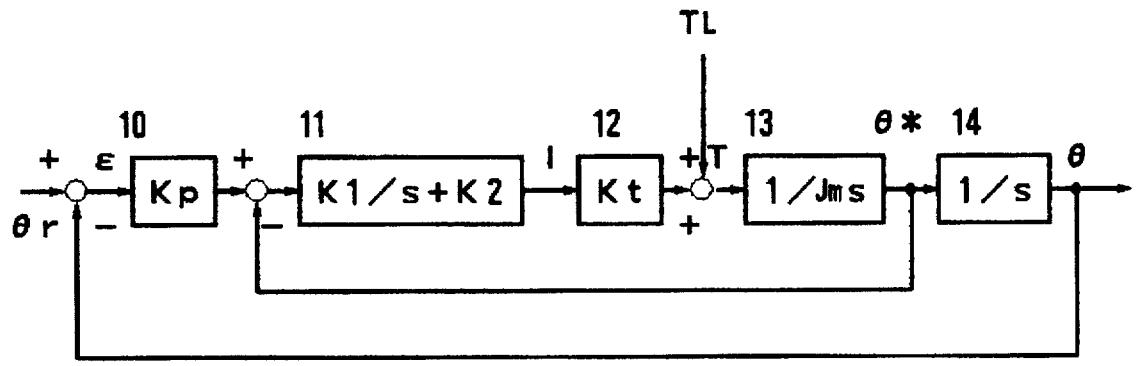
FIG. 3 is a block diagram of a servomotor control system.

FIG. 3 is a block diagram of a servomotor control system for a machine tool, robot, etc. in which position and speed are subjected to proportional (P) control and proportional-plus-integral (P & I) control. Kp of a transfer function 10 is a proportional gain of a position loop. Reference numeral 11 denotes a transfer function of a pre-compensator in a speed loop, and K1 and K2 are an integral constant (gain) and a proportional constant (gain), respectively. Reference numerals 12 and 13 denote transfer functions of a motor, and Kt and Jm are a torque constant and an inertia, respectively. Reference numeral 14 denotes a transfer function used to integrate an actual speed v and calculate a present position θ. TL is a disturbance torque.

The feedback value of the present position θ is subtracted from a position command value θr, and a speed command value is obtained by multiplying a position deviation ε (=θr−θ) of the resulting difference by the proportional constant Kp. A torque command (current command) I is obtained by effecting P & I control by using the difference (speed deviation) between the speed command value and the actual speed v. Based on this torque command I, the motor current is controlled to drive the motor. Thereupon, the motor rotates at the speed v.

In general, a model given by $$\dot{x}=Ax+Bu, \quad (1)$$

$$y=Cx \quad (2)$$

can be obtained in a control object, where u, y, x and $\dot{x}$ are an input, output, state variable, and first-order differential of the state variable, respectively.

Figure 4:
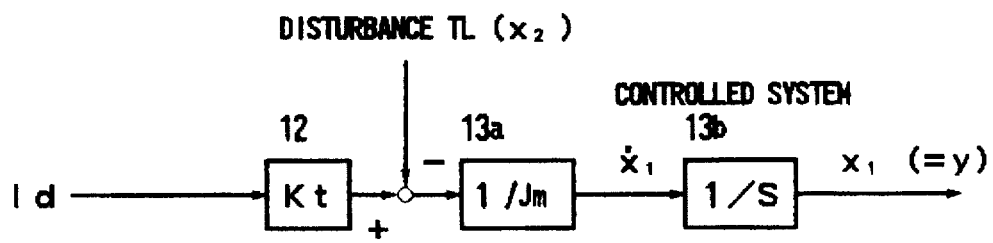
FIG. 4 is a block diagram of a model of a control object for a servomotor.

FIG. 4 is a block diagram of the model of the control object for the servomotor. In FIG. 4, reference numeral 12 denotes a transfer function of the torque constant Kt of the servomotor shown in FIG. 3. Reference numerals 13a and 13b denote a term of a transfer function (1/Jm) of the inertia Jm and an integral term (1/S), respectively, which is obtained by dividing the transfer function 13. In FIG. 4, Id represents a torque command as an input.

In the model shown in FIG. 4, the input u is the first-order current command Id, and the output y is a first-order motor speed. The state variable x(x1, x2) is made to be two-dimensional, and its x1 and x2 are made to correspond to the motor speed (=v) and the disturbance torque TL, respectively. Thereupon, x1 and y of equations (1) and (2) are expressed as follows:

$$\dot{x}1=(Id\cdot Kt+x2)/Jm, \quad (3)$$

$$y=x1, \quad (4)$$

where Kt and Jm are the torque constant and the rotor inertia, respectively. It is supposed, moreover, that the disturbance torque x2, unlike friction or gravity, makes no change within the sampling time, and that $\dot{x}2$, which is a first-order differential of x2, is 0.

Transforming equations (3) and (4), we obtain $$\begin{pmatrix} \dot{x}1 \\ \dot{x}2 \end{pmatrix} = \begin{pmatrix} 0 & 1/Jm \\ 0 & 0 \end{pmatrix} \begin{pmatrix} x1 \\ x2 \end{pmatrix} + \begin{pmatrix} Kt/Jm \\ 0 \end{pmatrix} Id \quad (5)$$

$$= A\cdot x + B\cdot Id \quad (6)$$

$$y = (1,0)\begin{pmatrix} x1 \\ x2 \end{pmatrix} \quad (7)$$

$$= C\cdot x \quad (8)$$

$$A = \begin{pmatrix} 0 & 1/Jm \\ 0 & 0 \end{pmatrix} \quad (9)$$

$$B = \begin{pmatrix} Kt/Jm \\ 0 \end{pmatrix} \quad (10)$$

$$C = (1,0) \quad (11)$$

$$x = \begin{pmatrix} x1 \\ x2 \end{pmatrix} \quad (12)$$

Figure 1:
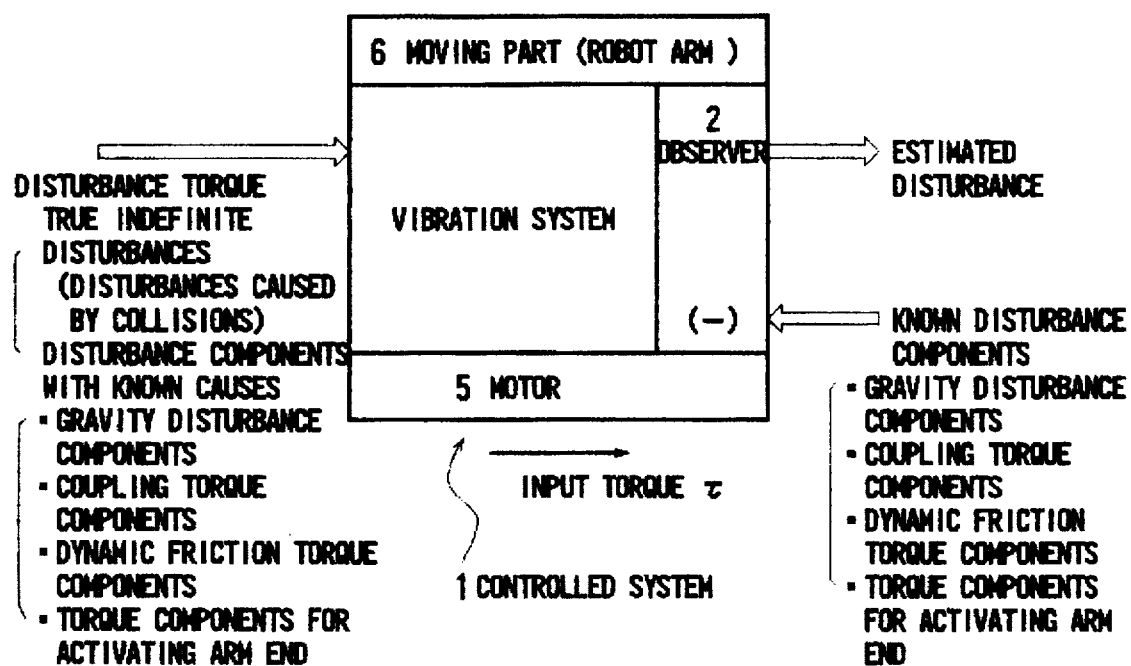
FIG. 1 is a diagram for illustrating a collision detecting method according to the present invention.
Figure 2:
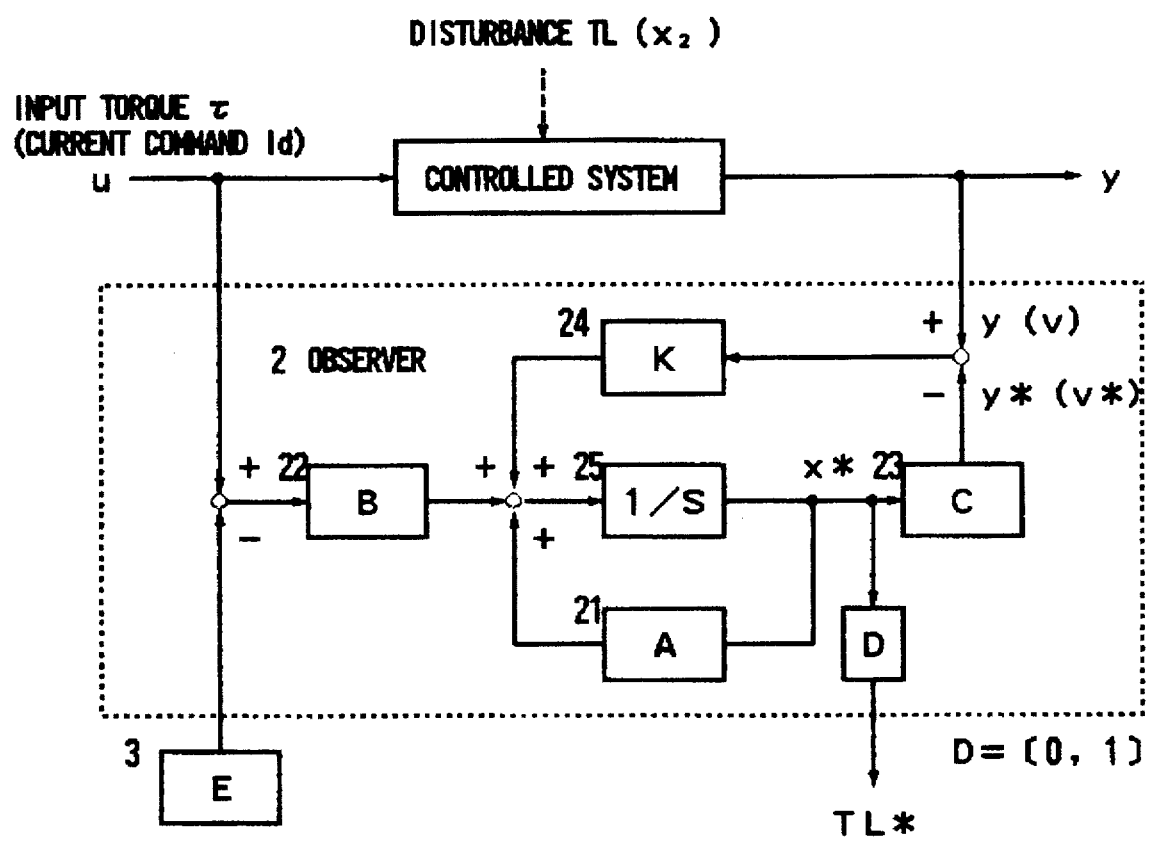
FIG. 2 is a block diagram for illustrating a disturbance estimating observer according to the invention.

If an observer of the same dimension for estimating the speed v and the disturbance torque TL is constructed by a conventional method using the aforementioned model, then the observer will be the one denoted by numeral 2 and surrounded by broken line in FIG. 2. K is a value given by equation (13) which is settled depending on the polar placement of the observer system.

$$K = \begin{pmatrix} K_{01} \\ K_{02} \end{pmatrix} \quad (13)$$

If the estimated state variable and estimated output of this observer are x* and y*, respectively, they are expressed as follows:

$$\dot{x}^*=A\cdot x^*+B\cdot u+k\cdot(y-y^*), \quad (14)$$

$$y^*=C\cdot x^*. \quad (15)$$

If the estimated error e of the state variable is x*−x, we obtain ė=(A−K·C)·e is obtained from the above equations, and also obtain $$\begin{aligned} e &= x^* - x \\ &= a\cdot \exp(A - K\cdot C)t, \end{aligned} \quad (16)$$

where a is a constant.

As seen from equation (16), therefore, the estimated state variable x* can be made to follow the state variable x by suitably selecting the value of K, and the state variable of the control object can be estimated from the estimated value of the observer.

In the observer 2 shown in FIG. 2, A, B and C of terms 21, 22 and 23 are parameters of the observer given by equations (9), (10) and (11), respectively. K of a term 24 is a parameter which is settled depending on the polar position of the observer system shown in FIG. 13. And a term 25 is an integral term. In FIG. 2, "*" in x* and v* represents an estimated value.

Since an estimated disturbance torque TL* is nothing but x2*, it can be obtained by computing x·[0, 1].

This estimated disturbance torque TL* is compared with a preset value for the detection of collision by a comparator (not shown). If the estimated disturbance torque TL* is great, an alarm or the like may be outputted, and the motor may be stopped by reducing the value in an integrator of the speed loop and subsequent speed commands to 0.

Figure 5:
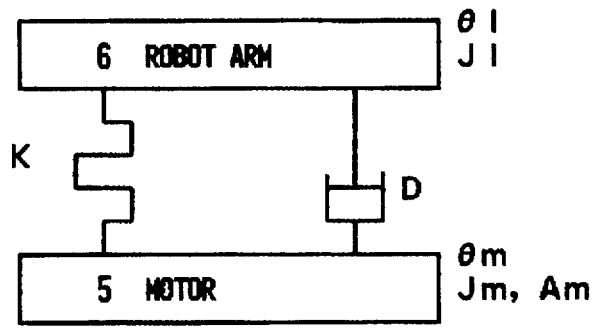
FIG. 5 is a diagram for illustrating a control object of a vibration system.

A vibration system of a robot arm 6 is converted into a model by a spring-damper system such as the one shown in FIG. 5. In FIG. 5, the motor 5 has the rotor inertia Jm and a dynamic friction coefficient Am, and its position is given by θm. Also, the robot arm 6 has a load inertia J1, and its position is given by θ1. Interposed between the motor and the robot arm is the spring-damper system which is represented by a vibration system spring constant K and a vibration system viscosity constant D.

In the model described above, a kinetic equation on the motor side is expressed as follows:

$$\tau = Jm \cdot \ddot{\theta}m + Am \cdot \dot{\theta}m + D \cdot (\dot{\theta}m - \dot{\theta}1) + K \cdot (\theta m - \theta 1), \quad (17)$$

where $\ddot{\theta}m$ is a second-order differential of the motor position θm, $\dot{\theta}m$ is a first-order differential of the motor position θm, and $\dot{\theta}1$ is a first-order differential of the arm position θ1.

On the other hand, a kinetic equation on the arm side is expressed as follows:

$$O = J1 \cdot \ddot{\theta}1 + D \cdot (\dot{\theta}1 - \dot{\theta}m) + K \cdot (\theta 1 - \theta m). \quad (18)$$

From equations (17) and (18), the torque τ is obtained as follows:

$$\tau = Jm \cdot \ddot{\theta} + Am \cdot \dot{\theta}m + J1 \cdot \ddot{\theta}1. \quad (19)$$

If vibration control is supposed to make the distal end of the arm follow a movement command value θr, the torque τ can be expressed as follows:

$$\tau = \ddot{\theta} + Am \cdot \dot{\theta}m + J1\ddot{\theta}. \quad (20)$$

In equation (20), the second term (Am·θ̇m) is a dynamic friction torque, and the third term (J1·θ̈r) is a torque for activating the arm end. A torque τ2 is obtained by subtracting the second and third terms from equation (16) as follows:

$$\begin{aligned}
\tau 2 &= \tau - (Am \cdot \dot{\theta}m + J1 \cdot \ddot{\theta}r) \quad (21)\\
&= \tau - (\text{dynamic friction torque} + \text{torque for activating the arm end})\\
&= Jm \cdot \ddot{\theta}m.
\end{aligned}$$

The dynamic friction torque and the torque for activating the arm end are generated by known disturbance torque components. Obtaining this disturbance torque component in advance, a torque command (τ2 of equation (21)) for only controlling the motor can be calculated by subtracting this disturbance torque component from the torque τ applied to the motor in response to the movement command θr. Then the accurate disturbance torque can be estimated by using this model of τ2.

Referring to the block diagram of FIG. 2, the sum of the dynamic friction torque and the torque for activating the arm end, which can be obtained in advance, is given as a compensating torque E. Thus, the value obtained by subtracting this compensating torque E from the input torque τ is applied to the transfer function B of the observer 2, so that the dynamic friction torque and the torque for activating the arm can be subtracted from the input torque τ.

In the above description, the disturbance dynamic friction torque and the torque for activating the arm end, which are produced by the vibration system, are used as the known disturbance torque component. However, a nonlinear disturbance torque component may be used in place of the disturbance torque component produced by the vibration system. This nonlinear disturbance torque component is used as the compensating torque E in like manner, and is subtracted from the input torque τ. Thereupon, the torque command τ2 for only controlling the motor is given by $$\begin{aligned}
\tau 2 &= \tau - Am \cdot \dot{\theta}m - J1 \cdot \ddot{\theta}r - \text{Grav} - \tau\text{cross} \quad (22)\\
&= \tau - \text{dynamic friction torque} - \text{torque for}\\
&\quad \text{activating the arm end} - \text{gravity disturbance}\\
&\quad \text{component} - \text{interference torque component}.
\end{aligned}$$

The disturbance torque can be estimated more accurately by using this model of τ2.

Figure 7:
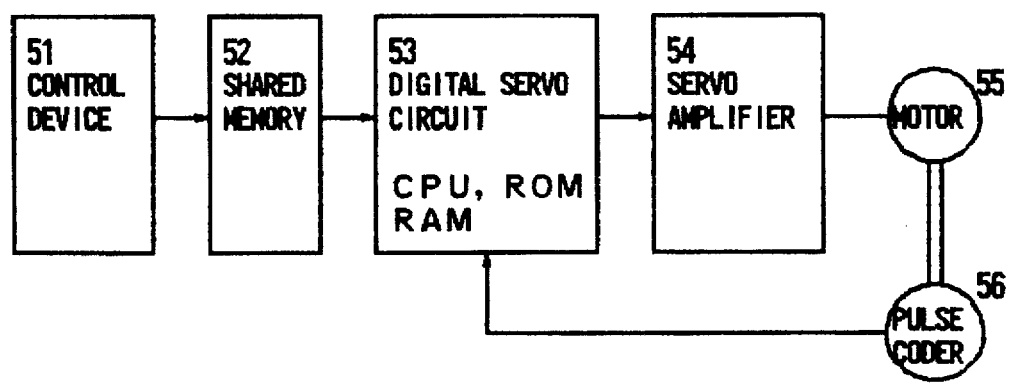
FIG. 7 is a block diagram showing the principal part of a servomotor system for carrying out the method of the present invention.

FIG. 7 is a block diagram showing the principal part of a servomotor system for carrying out a method according to the present invention. In FIG. 7, numeral 51 denotes a control device for controlling the machine tool, robot, etc. The movement command and various control signals are delivered from this control device to a digital servo circuit 53 through a shared memory 52. The digital servo circuit 53, which is composed of a processor, ROM, RAM, etc., is used for the servo control of the position, speed, etc. and deliver a current command to a servo amplifier 54, thereby controlling a servomotor 55 for each axis. Reference numeral 56 denotes a position/speed detector for detecting the position and speed. The detector 56, which is formed of a pulse coder or the like mounted on the shaft of the servomotor, delivers position and speed feedback signals to the digital servo circuit 53. Although FIG. 7 shows a servo system for one axis only, servo systems of the same arrangement are provided individually for various axes. These systems are constructed in the same manner as a conventional digital servo circuit.

Figure 6:
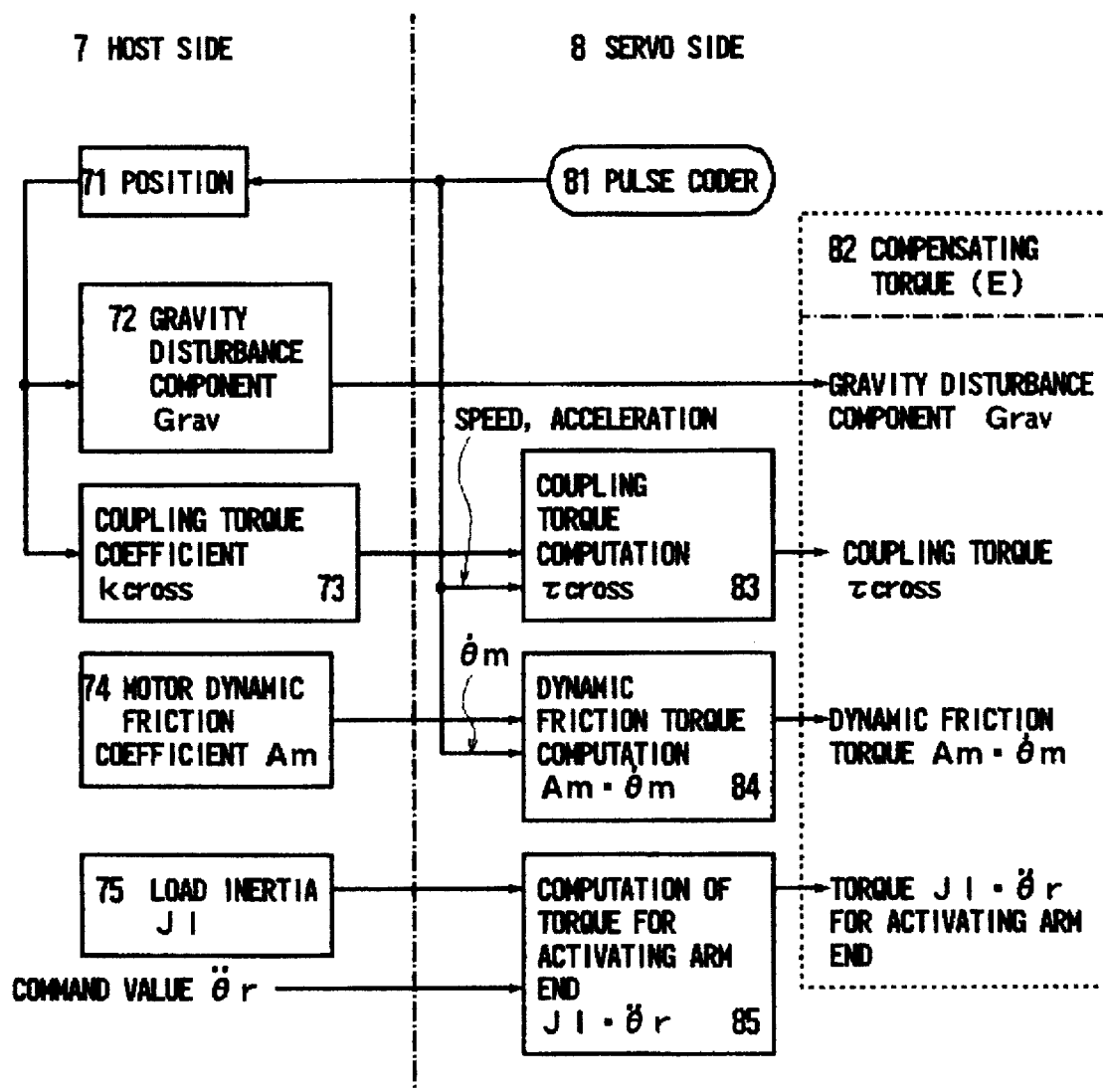
FIG. 6 is a diagram for illustrating the calculation of a compensating torque according to the method of the invention.

Referring now to FIG. 6, calculation of the compensating torque E according to the method of the present invention will be described.

In FIG. 6, a control section corresponding to the control device 51 of FIG. 5 is represented by a host side 7, a section corresponding to the digital servo circuit 53 is represented by a servo side 8, and other arrangements than the one for calculating the compensating torque E are omitted.

Referring to FIG. 6, the host side 7 is provided with a position computing unit 71 for computing the position of the control object in accordance with the position and speed signals from the pulse coder, a gravity disturbance component computing unit 72 which receives the position of the control object from the position computing unit 71 and computes a gravity disturbance component (Grav) corresponding to the received position, and an interference torque coefficient memory unit 73 for storing an interference torque coefficient (kcross) and outputting an interference torque coefficient corresponding to the position of the control object received from the position computing unit 71. The host side 7 is further provided with a motor dynamic friction coefficient memory unit 74 for storing and outputting the motor dynamic friction coefficient Am of the control object and a load inertia memory unit 75 for storing and outputting the load inertia of the control object.

On the other hand, the servo side 8 is provided with a pulse coder 81 which constitutes a position/speed detector, an interference torque computing unit 83 which receives speed and acceleration from the pulse coder 81 and the interference torque coefficient kcross from the memory unit 73 and computes the interference torque τcross, and a dynamic friction torque computing unit 84 which receives the first-order differential θ̇m of the motor position from the pulse coder 81 and the dynamic friction coefficient Am and computes the dynamic friction torque Am·θ̇m. The servo side 8 is further provided with a torque computing unit 85 for arm end activation which receives the load inertia J1 from the memory unit 75 and the second-order differential θ̈r of the movement command θr obtained from the host side and computes the torque J1·θ̈r for activating the arm end.

A compensating torque unit 82 receives the gravity disturbance component Grav obtained from the gravity disturbance component computing unit 72, the interference torque rcross obtained from the interference torque computing unit 83, the dynamic friction torque Am·θm obtained from the dynamic friction torque computing unit 84, and the torque J1·θr for activating the arm end obtained from the torque computing unit 85, and delivers the compensating torque E to the observer.

Thus, according to the method of the present invention, the host side 7 and the servo side 8 obtain the disturbance component, which can be known in advance, as the compensating torque E, and apply an input obtained by substracting the compensating torque E from the input torque τr, to the disturbance estimating observer, thereby estimating only true indefinite disturbances associated with the collision detection.

What is claimed is:

1. A collision detecting method, in which a collision of a control object including a moving part and a servomotor is detected by a disturbance estimating observer, comprising the steps of:

applying an input torque to the servomotor to drive the moving part and thereby produce disturbances in the control object;

obtaining a disturbance component known in advance from said disturbances produced in the control object;

subtracting said disturbance component from said input torque to generate a modified torque; and inputting said modified torque to the disturbance estimating observer which estimates only true indefinite disturbances to detect the collision of said moving part.

2. A collision detecting method according to claim 1, wherein said disturbance component is a nonlinear disturbance in said control object.

3. A collision detecting method according to claim 2, wherein said nonlinear disturbance includes at least one of a gravity torque, a coupling torque, and a dynamic friction torque.

4. A collision detecting method according to claim 1, wherein said disturbance component is a disturbance produced by said vibration system in said control object.

5. A collision detecting method according to claim 4, wherein said vibration system disturbance is a torque for activating an arm end.

6. A collision detecting method according to claim 1, wherein said disturbance component includes a nonlinear disturbance in said control object and a disturbance produced by a vibration system.

* * * * *

UNITED STATES PATENT AND TRADEMARK OFFICE
CERTIFICATE OF CORRECTION

PATENT NO. : 5,719,479

DATED : February 17, 1998

INVENTOR(S) : Kato et al.

It is certified that error appears in the above-identified patent and that said Letters Patent is hereby corrected as shown below:

Col. 4, line 58, change "x." to --x*--.

Col. 5, (Equation 19), change "$\theta m$" to --$\dot{\theta}m$--; and change "$\theta 1$" to -- $\dot{\theta}1$ --.

Col. 5, (Equation 20), change entire equation to

-- $\tau = Jm \cdot \ddot{\theta}m + Am \cdot \dot{\theta}m + Jl \cdot \ddot{\theta}r$.--.

Col. 6, lines 66 and 67, change "$\theta r$" to --$\dot{\theta}r$--. (1st Occur.)

Col. 7, line 4, change "rcross" to --$\tau$cross--;

line 5, change "$\theta m$" to --$\dot{\theta}m$--;

line 7, change "$\theta r$" to --$\dot{\theta}r$--.

line 14, change "$\tau r$" to --$\tau$--.

Signed and Sealed this

Fourth Day of August, 1998

Attest:

*Attesting Officer*

BRUCE LEHMAN

*Commissioner of Patents and Trademarks*